(12) United States Patent
Sallam

(10) Patent No.: US 7,797,733 B1
(45) Date of Patent: Sep. 14, 2010

(54) MONITORING AND CONTROLLING SERVICES

(75) Inventor: Ahmed Sallam, Los Angeles, CA (US)

(73) Assignee: Symantec Corporation, Mountain View, CA (US)

(*) Notice: Subject to any disclaimer, the term of this patent is extended or adjusted under 35 U.S.C. 154(b) by 1159 days.

(21) Appl. No.: 10/754,318

(22) Filed: Jan. 8, 2004

(51) Int. Cl.
G06F 7/04 (2006.01)
G06F 17/30 (2006.01)
G06F 15/16 (2006.01)
H04L 29/06 (2006.01)

(52) U.S. Cl. .......................................................... 726/4
(58) Field of Classification Search ................. 709/223; 726/4
See application file for complete search history.

(56) References Cited

U.S. PATENT DOCUMENTS

| | | | |
|---|---|---|---|
| 4,776,537 A | 10/1988 | Garside et al. |
| 4,888,798 A | 12/1989 | Earnest |
| 5,050,212 A | 9/1991 | Dyson |
| 5,103,476 A | 4/1992 | Waite et al. |
| 5,182,770 A | 1/1993 | Medveczky et al. |
| 5,432,851 A | 7/1995 | Scheidt et al. |
| 5,450,576 A | 9/1995 | Kennedy |
| 5,530,757 A | 6/1996 | Krawczyk |
| 5,548,532 A | 8/1996 | Menand et al. |
| 5,564,054 A | 10/1996 | Bramnick et al. |
| 5,596,711 A | 1/1997 | Burckhartt et al. |
| 5,606,609 A | 2/1997 | Houser et al. |
| 5,625,693 A | 4/1997 | Rohatgi et al. |
| 5,661,848 A | 8/1997 | Bonke et al. |
| 5,708,776 A | 1/1998 | Kikinis |
| 5,765,151 A | 6/1998 | Senator |
| 5,799,088 A | 8/1998 | Raike |
| 5,802,080 A | 9/1998 | Westby |
| 5,854,759 A | 12/1998 | Kaliski, Jr. et al. |
| 5,922,072 A | 7/1999 | Hutchinson et al. |
| 5,956,475 A | 9/1999 | Burckhartt et al. |
| 5,974,546 A | 10/1999 | Anderson |
| 6,000,032 A | 12/1999 | Millard |
| 6,014,744 A | 1/2000 | McKaughan et al. |
| 6,014,767 A | 1/2000 | Glaise |
| 6,048,090 A | 4/2000 | Zook |
| 6,061,788 A | 5/2000 | Reynaud et al. |
| 6,079,016 A | 6/2000 | Park |
| 6,088,803 A | 7/2000 | Tso et al. |

(Continued)

OTHER PUBLICATIONS

"Supporting Mobile Agent Applications Using Wrappers", Nils P. Sudmann, Dag Johansen, Department of Comptuer Science, University of Tromso, Norway, 2001 IEEE, pp. 689-695.*

(Continued)

Primary Examiner—Edan Orgad
Assistant Examiner—Harris C Wang
(74) Attorney, Agent, or Firm—Fenwick & West LLP

(57) ABSTRACT

A service manager (101) monitors and controls services (111), thereby providing protection against associated security vulnerabilities. The service manager (101) intercepts calls (105) to service related operations made by acting applications (103) and determines which acting application (103) made a specific intercepted call (105) to which target service (111). The service manager (101) then determines and executes an appropriate action based on a system policy (113). The appropriate action can comprise blocking the call (105), thereby preventing execution of service (111) based operations that conflict with the system policy (113).

13 Claims, 4 Drawing Sheets

U.S. PATENT DOCUMENTS

| | | | | |
|---|---|---|---|---|
| 6,587,888 | B1* | 7/2003 | Chieu et al. | 719/313 |
| 6,950,847 | B2* | 9/2005 | Harrisville-Wolff et al. | 709/201 |
| 6,973,577 | B1* | 12/2005 | Kouznetsov | 726/25 |
| 7,085,928 | B1* | 8/2006 | Schmid et al. | 713/164 |
| 2003/0105732 | A1* | 6/2003 | Kagalwala et al. | 707/1 |
| 2003/0167402 | A1* | 9/2003 | Stolfo et al. | 713/200 |
| 2004/0064737 | A1* | 4/2004 | Milliken et al. | 713/201 |
| 2004/0127190 | A1* | 7/2004 | Hansson et al. | 455/403 |
| 2004/0199763 | A1* | 10/2004 | Freund | 713/154 |

OTHER PUBLICATIONS

"Supporting Mobile Agent Applications Using Wrappers" Nils P. Sudmann, Dag Johansen, Department of Computer Science, University of Tromso, Norway 2001 IEEE pp. 689-695.*

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

MacNamra, John E., "Technical Aspects of Data Communication", 2ed. 1982, Digital Equipment Corporation, U.S.A. pp. 110-122.

Ore, Oystein, "Number Theory and Its History", 1976 Gudron Ore, U.S.A. pp. 124-129.

Schneier, Bruce, "Applied Cryptography", 2ed. 1996, Bruce Schneier, U.S.A. pp. 436-441.

Nair, et al., "A Symbol Based Algorithm for Hardware Implementation of Cycle Redundancy Check", IEEE, 1997.

"PC Medic 97 User's Guide", McAfee Associates, Inc., issued Mar. 1997, pp. 1-66.

"Norton Utilities for Windows User's Guide—Version 2.0", Symantec, 1995.

Microsoft.com web pages (online). Design a Windows NT Service to Exploit Special Operating System Facilities, Oct. 1997 (retrieved Aug. 29, 2003). Retrieved from the Internet: <URL: http://www.microsoft.com/msi/1097/winnt.aspx.

* cited by examiner

MONITORING AND CONTROLLING SERVICES

TECHNICAL FIELD

This invention pertains generally to computer security, and more specifically to securing a Windows NTx system by monitoring and controlling services.

BACKGROUND ART

Computers are vulnerable to malicious computer code attacks, such as worms, viruses and Trojan horses. As used herein, "malicious computer code" is any code that enters a computer without an authorized user's knowledge and/or without an authorized user's consent. Malicious computer code attacks attempt to transmit malicious code to a target computer, and then run the malicious code on that target computer.

Services are special programs that run on every Windows NTx computer. As used herein, a Windows NTx computer is any computing device running an operating system based on Microsoft Windows NT® code (e.g. Windows NT 3.x, Windows NT 4.x, Windows 2000, Windows XP, Windows 2003), including any future developed versions, extensions or equivalents thereof. Some services are provided by Microsoft, and others can be written and/or added by users, for example system administrators.

The Windows Service Control Manager is executed by Windows every time the system boots. The Control Manager automatically starts registered services before user logon, and before the Windows shell is started.

Registering and controlling a service on a Windows NTx computer requires a user to have sufficient security privileges. If the user has adequate privileges, then he or she can install a new service, register a new service, configure an existing service, terminate an existing service or suspend an existing service.

A service can be installed as an executable image or as a dynamic link library (DLL) that will run within the context of a service container process. Windows provides such service container processes, some of which contain system provided services, and as such are trusted processes.

Services present various security risks. Because they are automatically started before user logon or the Windows shell, a service could maliciously modify the logon process or the shell itself. Also, any application with sufficient right security privileges can terminate or modify crucial services, e.g., system services or anti-virus services. Furthermore, malicious code can be loaded as a DDL provided service into a trusted container, and thereby gain access to important system resources to which the trusted container has access.

It has been a common trend for malicious code to install itself as a service to gain control of a computer. Recall that services are installed and executed every time the system is booted. A Windows virus could simply wait until it is running within the context of a user who has enough privilege to install or configure a service, and then install a copy of itself as a service, and/or take control of an existing service.

Many mission critical applications are installed as services. Being able to define and execute a system wide security policy against malicious code that utilizes services as a method of infecting host machines is very important. The Microsoft provided library to manage services (registration, configuration, control, deletion, etc.) is very powerful. However, it does not provide the ability to solve the problems described above.

What is needed are methods, computer readable media and systems that allow the monitoring and control of services, such that a Windows NTx computer can be secured against service associated vulnerabilities.

DISCLOSURE OF INVENTION

A service manager (101) monitors and controls services (111), thereby providing protection against security vulnerabilities associated with services (111). The service manager (101) intercepts calls (105) and to service related operations that made by acting applications (103). The service manager (101) determines which acting application (103) made a specific intercepted call (105), as well as and the target service (111) of that call (105). The service manager (101) determines and executes an appropriate action based on a system policy (113). The appropriate action can comprise blocking the call (105), thereby preventing applications (103) from executing service (111) based operations that conflict with the system policy (113).

In some embodiments the service manager (101) monitors service (111) registration, and determines whether a service (111) should be registered or not, based on a system policy (113). In other embodiments, the service manager (101) intercepts service (111) configuration and deletion function calls (105), and restricts these operations based on a system policy (113). In yet other embodiments, the service manager (111) protects services (111) from being stopped or paused by unauthorized applications (103). The service manager (101) can also restrict the access of services (111) to system resources (301) such as file systems, networks, the registry, etc. Furthermore, the service manager (101) can protect system service containers from hosting any foreign malicious DLL.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
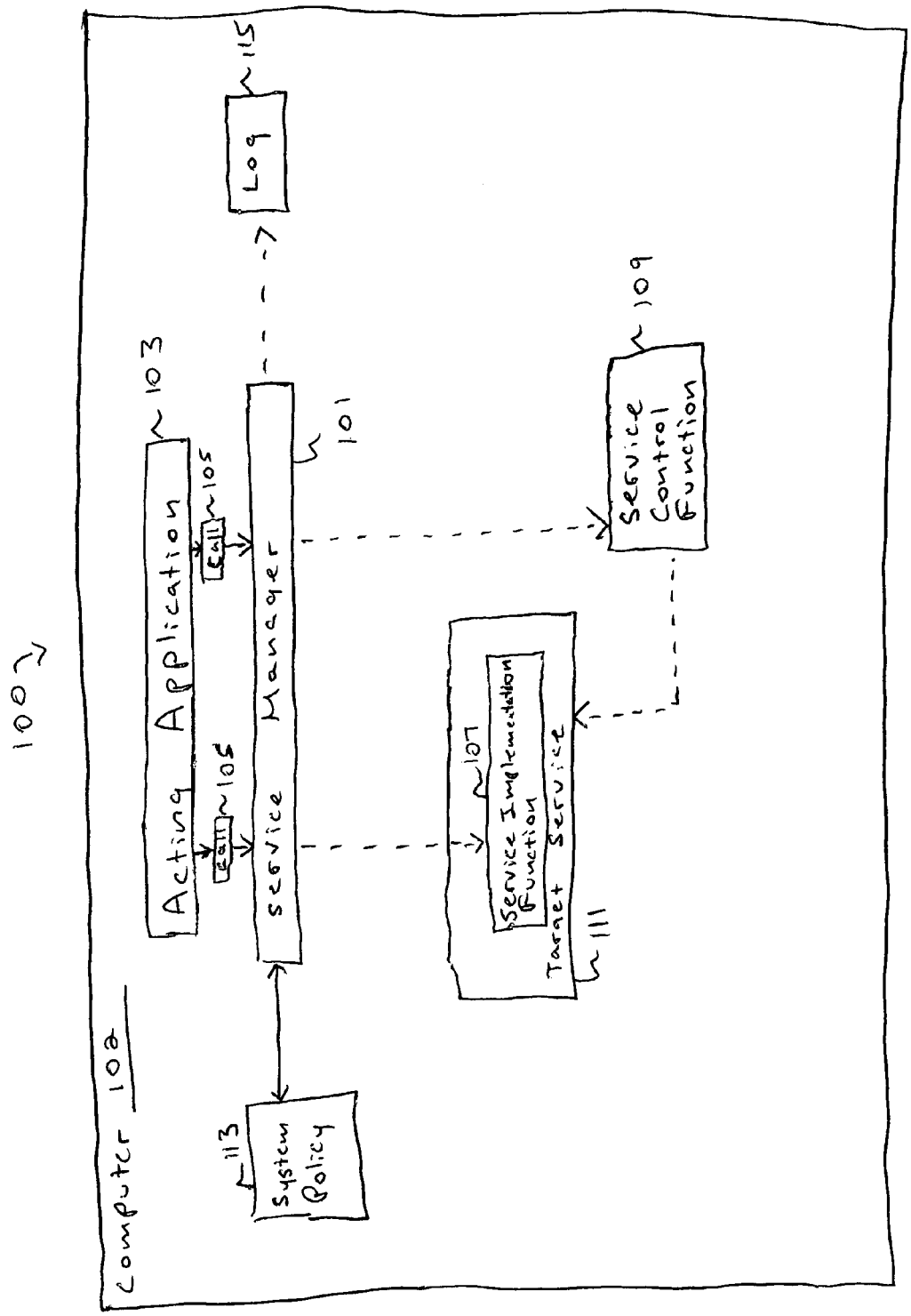
FIG. 1 is a block diagram illustrating a high level overview of a system for performing some embodiments of the present invention.

FIG. 1 illustrates a high level overview of a system 100 for performing some embodiments of the present invention. A service manager 101 executes on a computer 102. It is to be understood that although the service manager 101 is illustrated as a single entity, as the term is used herein a service manager 101 refers to a collection of functionalities described herein, which can be implemented as software, hardware, firmware or any combination of the three. Where a service manager 101 is implemented as software, it can be implemented as a standalone program, but can also be implemented in other ways, for example as part of a larger program, as a plurality of separate programs, or as one or more statically or dynamically linked libraries, executing in user and/or kernel space as desired.

Returning to FIG. 1, an acting application 103 makes a call 105 to a service related function. As used herein, an acting application 103 is any application that requests a service operation. As illustrated in FIG. 1, an acting application can call 105 a service implementation function 107 or a service control function 109. A service implementation function 107 is a function that is part of a service 111 itself, and which is used by the service during the course of its operations. Some service implementation functions 107 of interest utilized in current implementations of Windows NTx are outlined in Table 1. Of course, the present invention is not limited to intercepting these specific service implementation functions 107.

TABLE 1

| Function | Description |
| --- | --- |
| Handler | An application-defined callback function used with the RegisterServiceCtrlHandler function. |
| HandlerEx | An application-defined callback function used with the RegisterServiceCtrlHandlerEx function. |
| RegisterServiceCtrlHandler | Register a function to handle service control requests for an application. |
| RegisterServiceCtrlHandlerEx | Register a function to handle service control requests for an application. |
| ServiceMain | An application-defined function that serves as the starting point for a service. |
| SetServiceStatus | Updates the service control manager's status information for the calling service. |
| StartServiceCtrlDispatcher | Connects the main thread of a service process to the service control manager. |

A service control function 109 is a function provided by the Windows NTx system to be called by applications in order to register and control services. Examples of service control functions 109 provided by current implementations of Windows NTx to register and control services is outlined in Table 2. Of course, the present invention is not limited to intercepting these specific service control functions 109.

TABLE 2

| Function | Description |
| --- | --- |
| ChangeServiceConfig | Changes the configuration parameters of a service. |
| ChangeServiceConfig2 | Changes the optional configuration parameters of a service. |
| CloseServiceHandle | Closes the specified handle to a service control manager object or a service object. |
| ControlService | Sends a control code to a service. |
| CreateService | Creates a service object and adds it to the specified service control manager database. |
| DeleteService | Marks the specified service for deletion from the service control manager database. |
| EnumDependentServices | Retrieves the name and status of each service that depends on the specified service. |
| EnumServicesStatus | Enumerates services in the specified service control manager database. |
| EnumServicesStatusEx | Enumerates services in the specified service control manager database based on the specified information level. |
| GetServiceDisplayName | Retrieves the display name of the specified service. |
| GetServiceKeyName | Retrieves the service name of the specified service. |
| LockServiceDatabase | Requests ownership of the service control manager database lock. |
| NotifyBootConfigStatus | Reports the boot status to the service control manager. |
| OpenSCManager | Establishes a connection to the service control manager on the specified computer and opens the specified service control manager database. |
| OpenService | Opens an existing service. |
| QueryServiceConfig | Retrieves the configuration parameters of the specified service. |
| QueryServiceConfig2 | Retrieves the optional configuration parameters of the specified service. |
| QueryServiceLockStatus | Retrieves the lock status of the specified service control manager database. |
| QueryServiceObjectSecurity | Retrieves a copy of the security descriptor associated with a service object. |
| QueryServiceStatus | Retrieves the current status of the specified service. |
| QueryServiceStatusEx | Retrieves the current status of the specified service based on the specified information level. |
| SetServiceBits | Registers a service type with the service control manager and the Server service. |
| SetServiceObjectSecurity | Sets the security descriptor of a service object. |
| StartService | Starts a service. |
| UnlockServiceDatabase | Unlocks a service control manager database by releasing the specified lock. |

It is to be understood that although the present invention lends itself very well to use with Windows NTx and is described herein within that context, it is not so limited. The methods, computer readable media and systems disclosed and claimed herein could also be utilized within other operating system and environments that provide the equivalent of Windows NTx services (e.g., UNIX® daemons). All such operating systems are within the scope of the present invention.

As illustrated in FIG. 1, the service manager 101 intercepts calls made by acting applications 103 to service implementation functions 107 and to service control functions 109. The implementation mechanics for intercepting function calls are known to those of ordinary skill in the relevant art (e.g., hooking, interrupt vector table overwriting, wrapping, etc.), and their usage within the context of the present invention will be apparent to those of ordinary skill in the relevant art in light of this specification. For example, in current implementations of Windows NTx, the service control functions 109 are exported from ADVAPI32.DLL. Thus, in order to intercept service control functions 109 in one embodiment, the service manager 101 can observe the loading of ADVAPI32.DLL for every process through a kernel mode device driver. Upon the loading of ADVAPI32.DLL, the service manager 101 can load a hooking module. This hooking module can patch the code of every exported service control function 109 to install a jump instruction to transfer control to the service manager 101.

As another example, in current implementations of Windows NTx, the function RegisterServiceCtrlHandler or the function RegisterServiceCtrlHandlerEx is called to register a callback function to handle control requests to a service 111 for an application 103. In one embodiment of the present invention, the service manager 101 will hook calls 105 to these registration functions in user mode. These registration functions take as parameters the target service 111 and the callback function that will receive control commands (e.g., start service, stop service, etc.) The service manager 101 can replace the callback function with a callback wrapper which can then intercept control commands sent to the service 111, and thus enable the service manager 101 to determine and execute appropriate actions as discussed in detail below. Of course, in other embodiments other interception mechanisms can be used as desired.

Once the service manager 101 has intercepted a call 105 concerning a service 111, the service manager determines which acting application 103 made the call 105, and the target service 111 of the intercepted call 105. As used herein, target service simply means the service 111 which the intercepted call 105 concerns, e.g., the service whose implementation function 107 is being called, or the service that the called service control function 109 is being called to control.

The service manager 101 determines an appropriate action based on a system policy 113, and performs the appropriate action. System policies 113 are discussed in detail below. Concerning appropriate actions, recall that services 111 present various security risks, and that depending upon the trustworthiness of the acting application 103, the sensitivity of the target service 111 and other factors discussed below, it may be desirable to block the acting application 103 from making the intercepted call 105, and thereby prevent the service implementation function 107 or service control function 109 from executing under the current circumstances.

In these instances, the service manager 101 determines that the appropriate action is to block the acting application 103 from making the intercepted call 105 against the target service 111. In other instances, the service manager 101 can determine that the intercepted call 105 is entirely legitimate, and thus allows the call 105 to be made against the target service 111. In yet other instances, the service manager 101 can determine that it is appropriate to let the intercepted call 105 proceed against the target service 111, but to record details associated with the call (e.g., the calling application 103, the passed parameters, the time of the call 105, the result of the call 105, etc.) in a log 115 for possible review at a later time, for example by a system administrator.

Since the service manager 101 provides different sets of protection mechanisms, the service manager 101 can utilize different system policies 113 to control operations performed against different target services 111 under different circumstances. For example, it can be desirable to have a system policy 113 governing operations performed by services 111 themselves, as well as a system policy 113 governing operations requested by acting applications to be performed against services 111. The service manager 101 can specify such system policies 113 (based for example upon input from a system administrator or other user). It is to be understood that a wide variety of system policies 113 can be specified as desired. For example, a system policy 113 could dictate to allow or deny specific requested service operations based on characteristics of the acting application 103 that requested the service operation (e.g., the application 103 is trusted or suspected of being malicious), characteristics of the target service 111 (e.g., the target service 111 is a system service or a non-trusted service), characteristics of the requested service operation (e.g., the service operation is or is not deemed to be a particular security risk) and/or specific parameters passed to the intercepted call 105.

It is to be understood that the specification of system policies is very flexible in terms of defining the relevant characteristics of acting applications 103, target services 111 and requested operations. Different characteristics can be specified as desired, depending upon what factors are considered to indicate that a requested operation is malicious or legitimate, or otherwise should or should not be allowed to proceed. Some examples include a date of creation of an application 103 or service 111, the amount of time that a module has resided on the host machine, an application's 103 name, the content of a module (e.g., a module is suspected to contain malicious code), an MD5 or other hash function of that content (used for example to identify malicious code), a physical signature (for example identifying malicious code to a file scanning anti-virus engine), a runtime signature (for example, identifying malicious code to a memory based anti-virus scanning engine), the source of introduction of the module to the host machine (e.g., Internet, e-mail) or a digital signature.

Furthermore, in some embodiments the service manager specifies a system policy 113 which takes into account similarities found in the acting application 103 and the target service 111, which can indicate the propagation of self replicating malicious code. For example, a system policy 113 could indicate calls 105 are to be blocked where certain characteristics are found to be common between the calling acting application 103 and the target service 111. Examples include identical or suspiciously similar content or hash values and commonality of source (e.g., both originated from the same compressed file, or came via the same peer to peer Internet connection). Another example is where the target service 111 was created by the acting application 103 or through a process or thread created or executed by the acting application 103.

By intercepting calls 105 concerning services 111 and determining whether to block or allow calls 105 according to a system policy 113, the service manager 101 is able to control and monitor sensitive service 111 operations, and thus apply the system policy 113 to manage security vulnerabilities posed by services 111. For example, the following types of system operations can access or control sensitive resources, and thus calls thereto are blocked under suspicious circumstances in some embodiments of the present invention: registering a program or a module as a service 111, changing service 111 configuration parameters, sending a control code to a service 111, deleting a service 111, enumerating service 111 dependent services 111, enumerating system services 111, getting a service 111 display name, getting a service 111 key name, locking a service 111 database and querying service 111 registration information. The service manager 101 can control all of these operations by intercepting calls 105 thereto issued by acting applications 103. It is to be understood that these service 111 operations are only examples of sensitive service 111 operations, and which appropriate actions to take under which circumstances (e.g., which calls 105 made by which applications 103 to which operations to block, allow and/or log) is determined by a system policy 113, which is a design variable which can be specified and/or modified by the service manager 101, for example in response to input from a system administrator or user, or from an update received from a remote computer such as a server storing updated malicious code signatures. In some embodiments, default system policies 113 are also provided by the service manager 101, which can optionally be edited by, for example, a system administrator.

Figure 2:
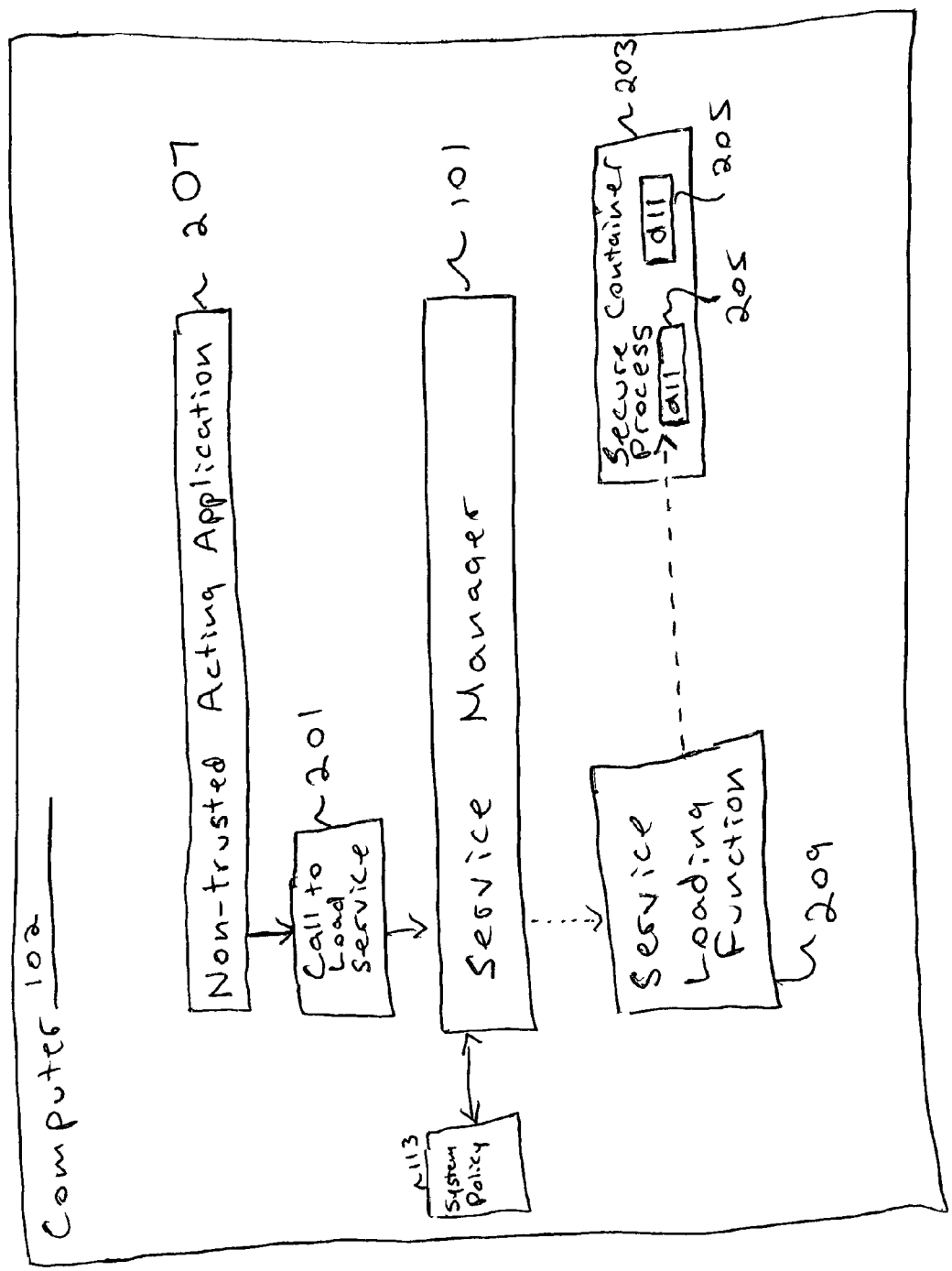
FIG. 2 is a block diagram illustrating instances in which an intercepted call is a call to load a service into a secure container, according to an embodiment of the present invention.

Turning to FIG. 2, in some instances the intercepted call 105 is a call 201 to load a service 111 into a secure container 203. Recall that a service 111 can be created as either a standalone executable that by itself acts as the service container 203, or as a DLL 205 that will be hosted by one of the system standard services containers 203.

A service 111 can be loaded into an empty service container process 203 provided by the system. However, Windows NTx also provides certain well known system services containers 203, which host system services 111 in the form of DLLs 205. An application 103 with enough privilege can load a service 111 into one of these system containers 203. Some examples of system services 111 and their service containers are provided in Table 3.

TABLE 3

| Container | Hosted System Services |
|---|---|
| services.exe | AppMgmt |
| | Browser |
| | Dhcp |
| | dmserver |
| | Dnscache |
| | Eventlog |
| | lanmanserver |
| | LanmanWorkstation |
| | LmHosts |
| | Messenger |
| | PlugPlay |
| | ProtectedStorage |
| | seclogon |
| | TrkWks |
| | W32Time |
| | Wmi |
| lsass.exe | Netlogon |
| | PolicyAgent |
| | SamSs |
| svchost.exe | RpcSs |
| | Spooler |
| | cisvc |
| | EventSystem |
| | Netman |
| | NtmsSvc |
| | RasMan |
| | SENS |
| | TapiSrv |

It can be very important to restrict certain services 111 that install themselves as DLLs 205 from running within the context of one of the well known system services containers 203. The name of each service's 111 container 203 is specified in the corresponding service entry in the registry database, which is generated by the service control manger during the call to the relevant function, e.g., CreateService. Allowing a service 111 to be loaded as a DLL 205 into a secure container 203 can be dangerous, because it allows the service 111 to share process address space with critical system services 111, which can access secure system resources. In other words, by loading a service 111 as a DLL 205 into a secure container process 203 hosting system services 111 running as DLLs 205, the loaded service 111 can also access secure resources, as it is running in the same process space. By intercepting calls to load services 201, and by scanning the registry database (discussed in more detail below), the present invention can prevent that from occurring.

As illustrated in FIG. 2, in one embodiment of the present invention, the service manager 101 closes the above described security loophole by determining whether the acting application 103 that made the intercepted call to load a service 201 is a non-trusted application 207. If the application 103 is trusted, it is allowed to load the service 111 into a secure container 203. However, if the application 103 is a non-trusted application 207, the service manager 101 blocks the non-trusted application 207 from calling the service loading function 209, thereby preventing the loading of the service 111 into the secure container 203. It is to be understood that the service manager 111 can classify applications 111 as trusted or non-trusted 207 based on a wide variety of system policies 113, which are design variables as explained above.

Figure 3:
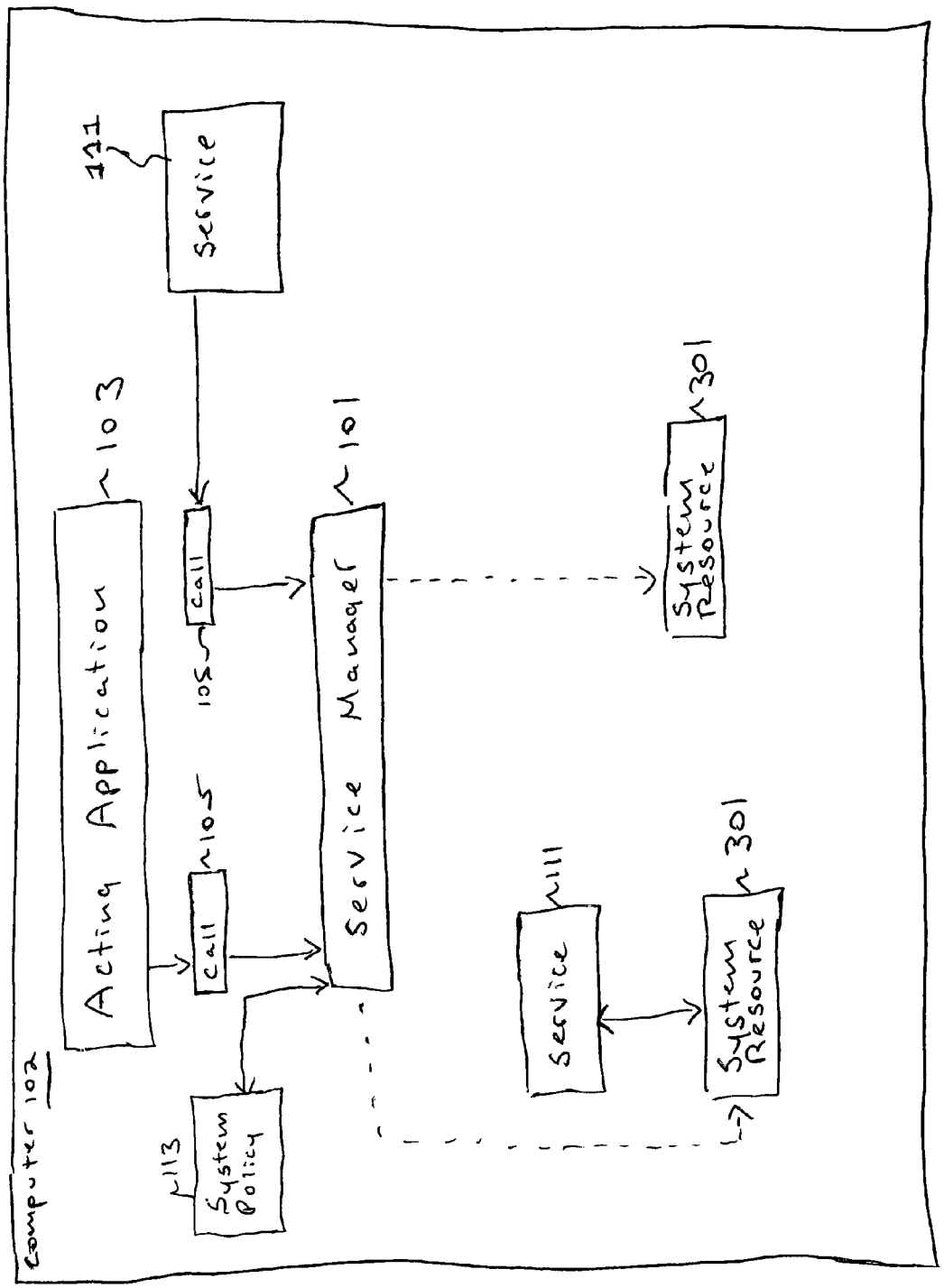
FIG. 3 is a block diagram illustrating the service manager protecting system resources against malicious and other unauthorized service associated access, according to an embodiment of the present invention.

FIG. 3 illustrates embodiments of the present invention in which the service manager 101 protects system resources 301 against malicious and other unauthorized service 111 associated access. The service manager 101 intercepts calls 105 to access system resources 301. As illustrated, these can be calls 105 to access system resources 301 owned by a service 111, and/or calls 105 by a service 111 to access system resources. Which calls 105 to which system resources 301 to intercept is a variable design choice, which can be made based on which system resources 301 it is considered desirable to monitor and protect. Examples of system resources 301 to which the service manager 101 restricts access in various embodiments of the present invention include local file system objects (e.g., local folders, directories, volumes, etc.), remote file system resources (e.g., remotely located folders, directories, shares, etc.), inter process communication resources (e.g., ports, named pipes, mail slots, sockets, shared memory, etc.), executing code (e.g., threads, processes, etc.), network resources (e.g., connect or listen to certain port) and/or logging resources (system event log, etc.). Of course, the present invention is not restricted to these examples. In some embodiments, the service manager 101 restricts access to some or all of these examples of system resources 301, and in other embodiments the service manager restricts access to more, other or no system resources 301 as desired.

Returning to FIG. 3, after intercepting a call 105 to access a system resource 301, the service manager 101 determines that the intercepted call 105 concerns a service 111. As explained above, this can be a call 105 by a service 111 to access a system resource, or a call 105 to access or otherwise affect a system resource associated with a service. The service manager 101 determines which service 111 the intercepted call 105 concerns, and which system resource 301 the intercepted call 105 is attempting to access. The service manager 101 proceeds to determine and execute an appropriate action based on a system policy 113.

As explained above in conjunction with FIG. 1, appropriate actions can be blocking the call 105 or allowing the call 105 to access the system resource 301 (with or without logging, as explained above). As with the embodiments illustrated in FIG. 1, the specific system policy 113 to employ in order to determine appropriate actions is a design variable. Examples of factors on which the system policy 113 can be based include characteristics of the associated service 111, characteristics of the system resource 301 and parameters passed to the intercepted call 105.

Once again, the implementation mechanics of intercepting calls 105 to access system resources 301 will be apparent to those of ordinary skill in the relevant art in light of this specification. For example, the service manager 101 can control access to system resources 301 by installing a system wide hooking layer to intercept and filter calls 105 to all of the functions that provide access to the system resources 301 of interest. In other embodiments, the service manager 101 can intercept service implementation functions 107 as described above and determine whether a service implementation function 107 is attempting to access a system resource 301. Of course, the intercepting of calls 105 to access system resources 301 is not limited to these implementations, and can be executed in other ways in other embodiments as desired.

In some embodiments, the service manager 111 monitors and protects executing code and communications channels owned by services 111. Executing code and communications channels are types of system resources 301 that are vulnerable to malicious code, and thus are here discussed in greater detail. Malicious code might try to terminate or suspend a service 111, including for example a service that provides anti-virus services. Recall that a service 111 can run as a process or a DLL. Thus, to prevent the unauthorized termination of services 111, in this embodiment the service manager 101 intercepts calls to terminate or suspend processes and threads (e.g., the Windows NTx API calls to control the execution of threads and processes), and takes appropriate action based on a system policy 113 as described above. Thus, non-trusted applications 103 and the like can be prevented from terminating services 111. Where the system policy 113 dictates, the call to control the thread or service is blocked, such that the service 111 cannot be stopped by non-trusted applications 103.

In one embodiment, to implement the above-described functionality, the service manager 111 identifies the thread-id of the main thread designated by the service control manager for services 111 of interest registered as DLL type services 111. This thread-id will be checked against different calls that are used to suspend or terminate a thread, and the service manager 101 can protect the execution of the protected service thread based on the system policy 113. Since the main service thread may launch other threads, the proposed system will monitor creation of new child threads as well as child processes (and their progeny) and apply the security policy 113 to those as well. The purpose of that is to protect the service's progeny threads and processes from being suspended or terminated if the security policy 113 prohibits that.

Similar to DLL type services, if the service 111 is registered as an executable type service, then the service manager 111 protects the service 101 and all of its progeny threads and processes from being terminated or suspended by malicious code.

Additionally, in some embodiments the service manager 101 monitors communication channels owned by protected service's 101 threads and processes (including their progeny) to ensure that the other thread or process listening at the other side of the communication channel is an authorized thread and owned by an authorized process, according to the system policy as desired. The service manager can block, allow and/or log communication through service associated communication channels as appropriate.

Figure 4:
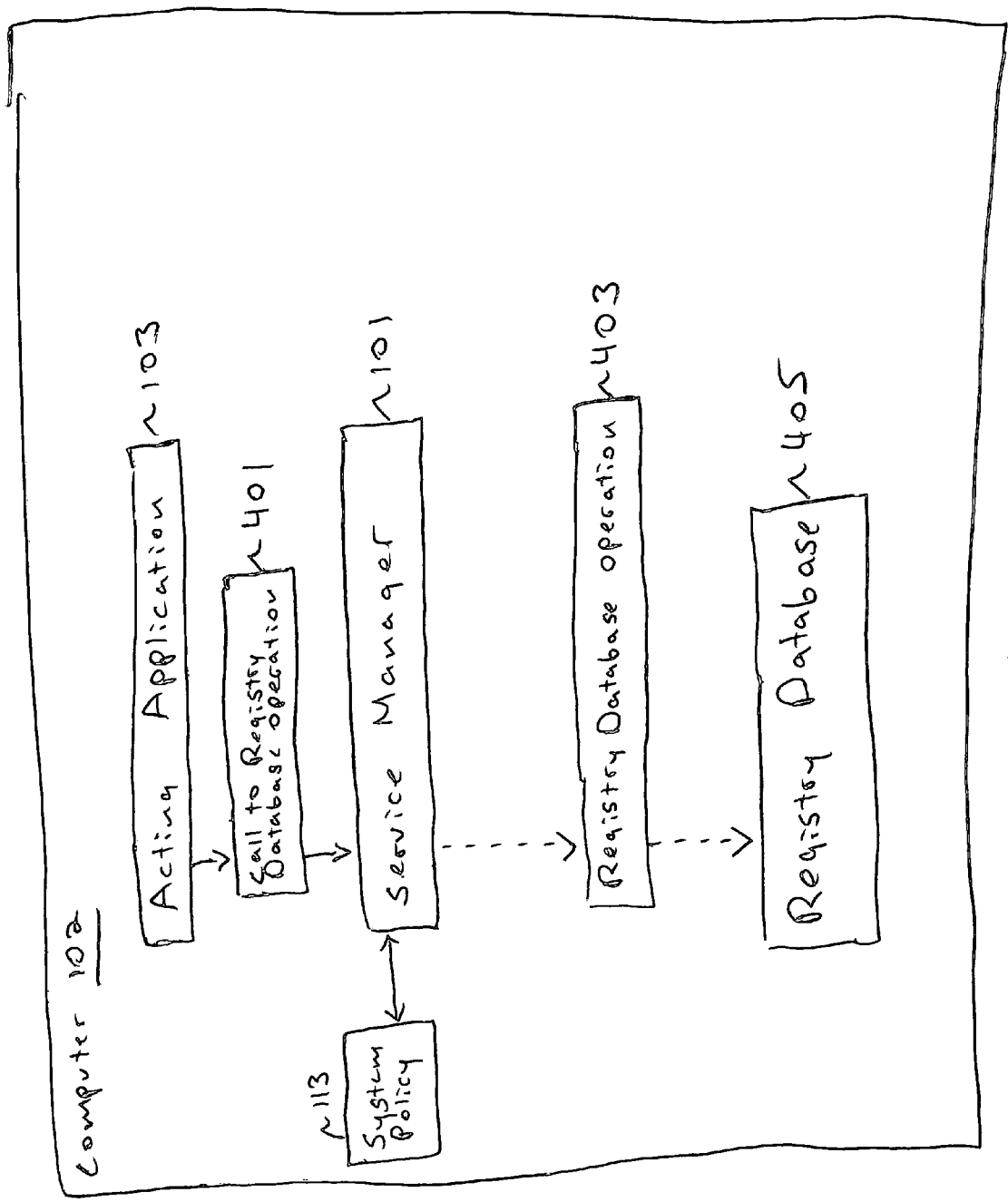
FIG. 4 is a block diagram illustrating the service manager intercepting calls to registry database operations made by acting applications, according to an embodiment of the present invention.

FIG. 4 illustrates other embodiments of the present invention, in which the service manager 101 intercepts calls 401 to registry database operations 403 made by acting applications 103. In Windows NTx, service registration, enumeration and configuration operations are essentially based on accessing the registry database 405 entries that correspond to the target service 111. A malicious application 103 could alter the service configuration by just modifying the corresponding entries directly in the registry database 405. Therefore, in some embodiments the service manager 101 intercepts calls 401 to registry database operations 403, determines which acting application 103 made a specific intercepted call 401, determines an appropriate action based on the system policy 113, and performs the determined appropriate action (e.g., blocks the call).

As described above, the implementation mechanics for intercepting calls 401 under these circumstances will be apparent to those of ordinary skill in the art in light of this specification. For example, in one embodiment the service manager 101 installs a system wide hooking layer to monitor and control calls 401 to registry database 405 services. The Service manager 101 can also utilize this as a method to identify malicious applications 103. In some embodiments, a system policy can dictate that applications 103 that do not use the standard operating system interface to access the registry database but instead attempt to access it directly are to be considered malicious.

In one embodiment, the service manager 101 monitors the changes made directly to the system services 111 section in the registry database 405. A kernel mode device driver assists in installing the user mode hooks and observing modifications to the registry database 405.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for monitoring and controlling services, the method comprising the steps of:
   a service manager intercepting calls to service related operations made by acting applications;
   the service manager determining which acting application made a specific intercepted call;
   the service manager determining a target service of the specific intercepted call made by the acting application;
   the service manager identifying a characteristic common to the acting application that made the specific intercepted call and the target service of the specific intercepted call, the common characteristic comprising a hash of content;
   the service manager determining whether to block the acting application from making the specific intercepted call based at least in part on the common characteristic; and
   responsive at least in part to the service manager determining to block the acting application from making the specific intercepted call, the service manager blocking the acting application from making the specific intercepted call.

2. The method of claim 1 wherein:
   the service manager intercepting calls to service related operations made by acting applications comprises intercepting calls to service implementation functions.

3. The method of claim 1 wherein:
   the service manager intercepting calls to service related operations made by acting applications comprises intercepting calls to service control functions.

4. The method of claim 1 wherein the service manager intercepting calls to service related operations further comprises the steps of:
   the service manager intercepting calls to service registration functions;
   the service manager replacing a callback function being registered with a callback wrapper; and
   the callback wrapper intercepting control commands sent to the service.

5. The method of claim 1 wherein:
   the common characteristic comprises one or more from the set consisting of:
   a date of creation;
   a length of time since being loaded on a host machine; and
   a source of introduction to the host machine.

6. The method of claim 1 wherein:
   the specific intercepted call is a call to load a service into a secure container.

7. A computer implemented method for monitoring and controlling services, the method comprising the steps of:
   a service manager intercepting calls to access system resources made by acting applications;
   the service manager determining that an intercepted call concerns a service;
   the service manager determining which service the intercepted call concerns;
   the service manager determining which acting application made the intercepted call;
   the service manager identifying a characteristic common to the acting application that made the intercepted call and the service the intercepted call concerns, the common characteristic comprising a hash of content;
   the service manager determining whether to block the acting application from making the intercepted call based at least in part on the common characteristic; and
   responsive at least in part to the service manager determining to block the acting application from making the intercepted call, the service manager blocking the acting application from making the intercepted call.

8. The method of claim 7 wherein:
   the service manager determining that an intercepted call concerns a service comprises the service manager determining that the call was made to affect a system resource associated with a service.

9. The method of claim 8 wherein:
   the service manager determining that the intercepted call was made to affect a system resource associated with a service comprises the service manager determining that the intercepted call was made to affect a system resource comprising one or more from the set consisting of:
   a thread owned by the service;
   a process owned by the service;
   a communication channel owned by the service;
   a progeny thread of the service;
   a progeny process of the service;
   a communication channel owned by a progeny process of the service; and
   a communication channel owned by a progeny thread of the service.

10. The method of claim 9 wherein:
    the specific intercepted call is a call to perform an action affecting the system resource associated with a service, the action being one or more from a set consisting of:
    suspending the resource; and
    terminating the resource.

11. The method of claim 7 wherein:
    the common characteristic comprises one or more from the set consisting of:
    a date of creation;
    a length of time since being loaded on a host machine; and
    a source of introduction to a host machine.

12. The method of claim 1, wherein the specific intercepted call is a call to start the target service.

13. The method of claim 1, wherein the service manager identifying a characteristic common to the acting application and the target service comprises:
    the service manager identifying the characteristic common to the acting application and the target service at the time the specific intercepted call was made by the acting application.

* * * * *